Sept. 15, 1936. A. A. BUREAU Re. 20,106

REEL

Original Filed Aug. 9, 1930 2 Sheets-Sheet 1

Inventor
A. A. Bureau
By H. B. Whitfield Atty.

REEL

Original Filed Aug. 9, 1930 2 Sheets-Sheet 2

Inventor
A. A. Bureau
By N. B. Whitfield Att'y.

Reissued Sept. 15, 1936

Re. 20,106

UNITED STATES PATENT OFFICE 20,106

REEL

Arthur A. Bureau, Chicago, Ill., assignor to Western Electric Company, Incorporated, New York, N. Y., a corporation of New York Original No. 1,908,624, dated May 9, 1933, Serial No. 474,102, August 9, 1930. Application for reissue April 23, 1935, Serial No. 17,797

15 Claims. (Cl. 242—77)

This invention relates to reels, and more particularly to metallic reels for supporting material such as telephone cable.

An object of the invention is the provision of a simple, durable reel having the greatest degree of strength commensurate with its weight.

In accordance with one embodiment, the invention contemplates a reel comprised of heads spaced apart by a flanged drum, each head being composed of a plurality of radially extending channel members secured at their inner ends to an annular channel which forms the hub of the head and secured at their outer ends to a circular shaped channel member. Angle members disposed between the radially extending channel members at their outer extremities serve to strengthen the heads, and segmental plates or disks having their outer edges recessed to receive the channel members are welded to the radially extending channel members and the circular shaped channel members to present a smooth inner surface on the reel heads. The drum which spaces the heads apart has flanges formed thereon which engage the heads of the reel, and bolts extend through the flanges and through the heads of the reel for securing the drum between the heads. One of the radially extending channel members and a portion of the segmental disk adjacent thereto is cut away to permit the end of the cable to be passed through the aperture so formed when it is desired to wind a cable upon the reel. All of the parts of the heads are welded together to provide a rigid structure so as to have the strength which would be present if the parts were integral.

Other objects and advantages of the invention will become apparent from a consideration of the following detailed description, reference being had to the accompanying drawings, wherein Fig. 1 is a fragmentary side elevational view of a cable reel embodying the features of the invention;

Figure 1:
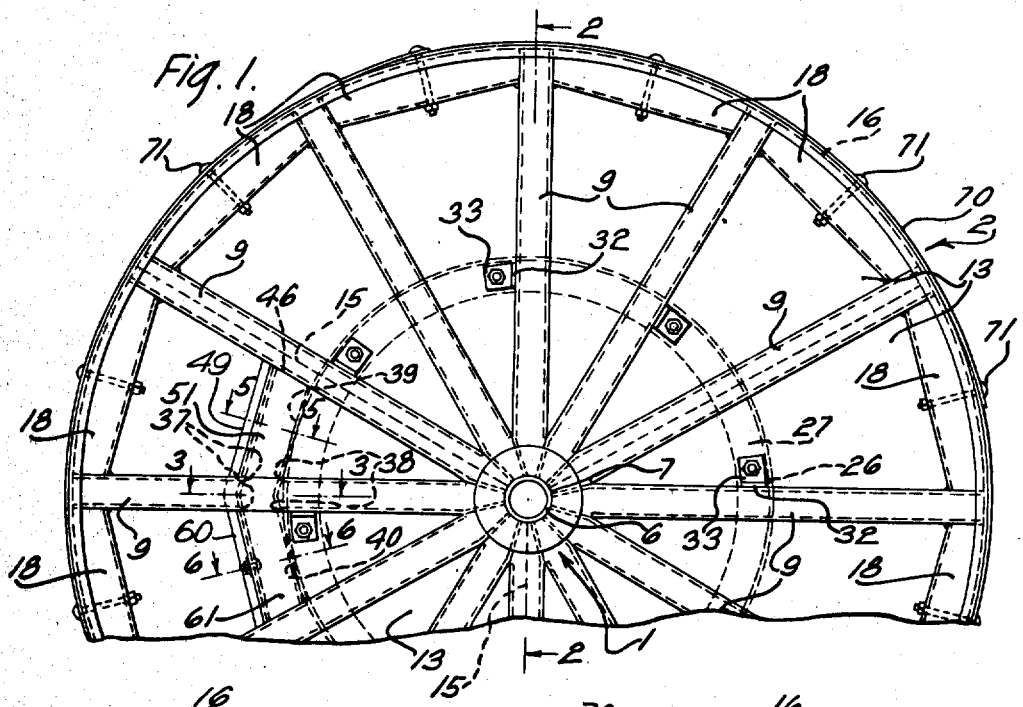
Figure 5:
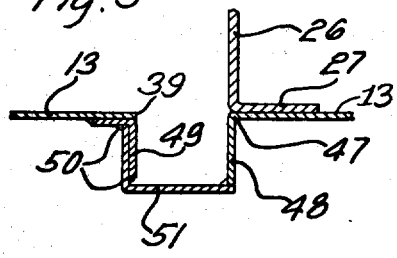
Figure 6:
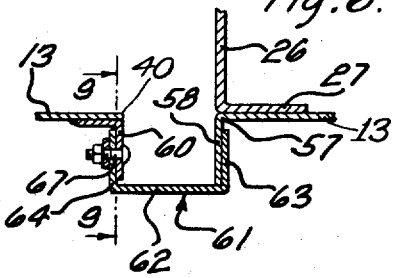
Figure 7:
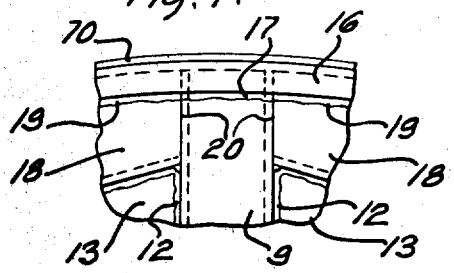
Figure 8:
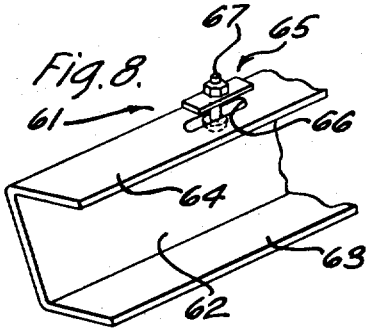
Figure 9:
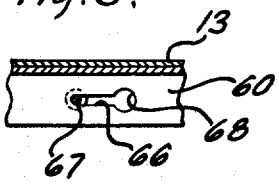

Figs. 5 and 6 are fragmentary sectional views taken on the lines 5—5 and 6—6 of Fig. 1 in the direction of the arrows;

Fig. 7 is an enlarged fragmentary side elevational view of the outer edge of the head of the reel shown in Fig. 1, and discloses details of construction thereof;

Fig. 8 is a fragmentary perspective view of a cap for covering the aperture in the reel head through which cable may be passed;

Fig. 9 is a fragmentary sectional view taken on the line 9—9 of Fig. 6, and

Figure 10:
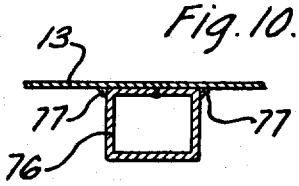

Fig. 10 is a fragmentary sectional view through a reel head showing another type of radially extending member.

Figure 2:
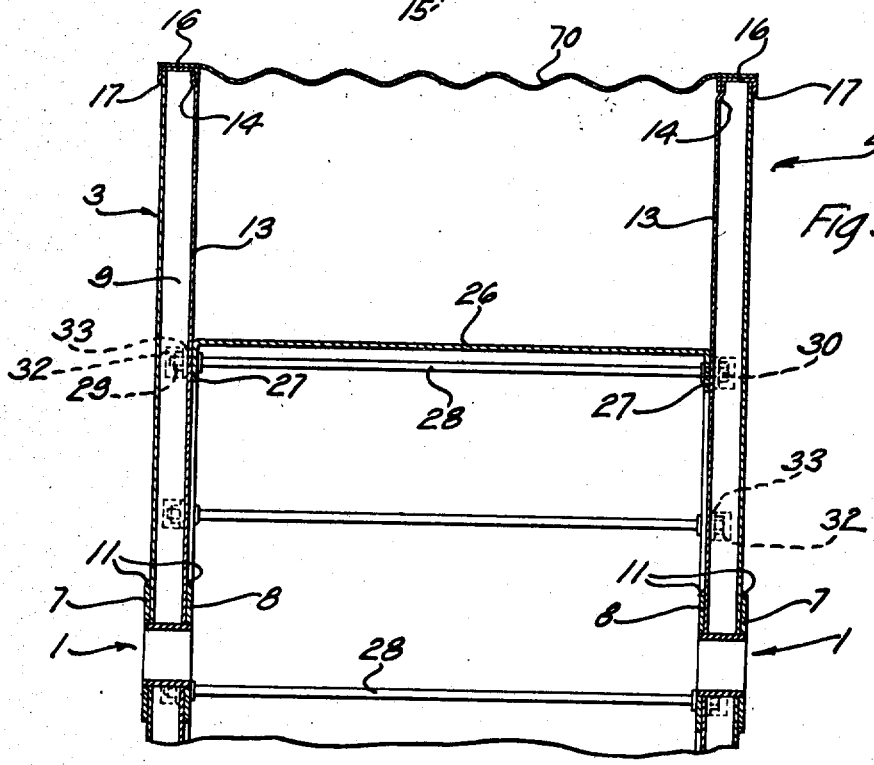
Fig. 2 is a fragmentary sectional view taken substantially on the line 2—2 of Fig. 1 in the direction of the arrows.
Figure 4:
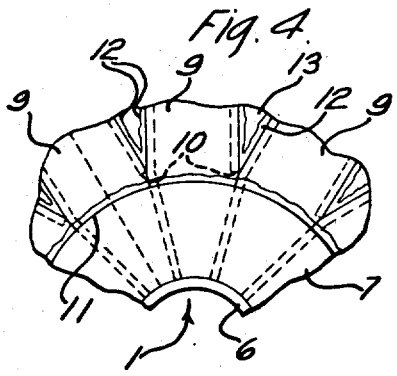
Fig. 4 is an enlarged fragmentary view of the reel shown in Fig. 1 showing in detail the construction of the reel adjacent the hub thereof.

Referring now to the drawings wherein like reference characters designate the same parts throughout the several views, particular reference being had first to Figs. 1 and 2, the numeral 1 designates generally the hub portion of one of the heads 2 of the reel, the other head being indicated by the reference numeral 3. The construction of the two heads is the same except as pointed out hereinafter and therefore only one head will be described in detail for the sake of simplifying the disclosure. As shown in detail in Fig. 4, the hub 1 is comprised of a tubular member 6 to which is secured, by welding, a pair of annular plates 7 and 8 to form an annular channel member from which radiate a number of ribs 9. The ribs 9 are formed of channel members having their inner ends tapered as shown in Fig. 4, one of the flanges thereof being cut away as shown at 10 and are welded to the hub 1 at 11.

Welded to the edges of the flanges of the ribs 9, as shown at 12 (Figs. 4 and 7), are segmental plates 13 which are offset adjacent their outer edges as shown at 14 (Fig. 2) and welded together along the lines 15 (Fig. 1) so as to provide a comparatively smooth inner surface for the reel head. A circular channel member 16 is welded to the outer edges of the radially extending ribs 9, as indicated at 17 (Figs. 2 and 7) and angle bars 18 having their outer edges shaped to conform to the curvature of the circular channel members 16 are welded to the channel members 16 at 19 and to the ribs 9 at 20 to reinforce the heads by acting as trusses between the ribs.

Figure 3:
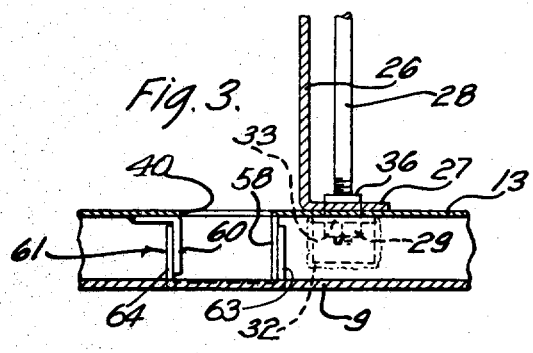
Fig. 3 is a fragmentary sectional view taken on the line 3—3 of Fig. 1 in the direction of the arrows.

Positioned between the heads 2 and 3 is a drum 26 having inwardly extending flanges 27 formed thereon for spacing the heads apart. The drum 26 is secured in place and the heads are held in position against the flanges thereof by through bolts 28 which extend through the disks 13 and the flanges 27, the through bolts being threaded at one end to receive nuts 29, and having a head 30 formed on the other end thereof, thereby to hold the assembled drum and heads in a predetermined position. As shown in Fig. 3, a flanged bushing 36 is provided in an opening in each head for each of the through bolts 28 and the flanges 27 are provided with corresponding openings for receiving the bushings. The bushings 36 have the flange thereof bent so that it may be welded to the adjacent ribs 9 as shown at 32 and to the segmental plates 13 as shown at 33, Figs. 1 and 3.

Referring now to Figs. 1, 3, 5, 6, 8, and 9, which show the aperture through which cable may be passed when it is desired to wind it upon the reel, one of the ribs 9 has its flanges cut away as shown at 37 and 38 (Fig. 1) and the segmental plate 13 adjacent to such rib 9 has a pair of slots 39 and 40 cut therein tangent to the peripheral surface of the drum 26. In forming the slot 39, a portion of the plate 13 is bent upwardly at 46 (Fig. 1) to provide a rounded edge over which the cable may be bent without cutting it and passed into the slot 39, under the web portion of the rib 9 which has the flanges thereof cut away as shown at 37 and 38 and into the slot 40. The material of the plate 13 is so formed at 47 (Fig. 5) as to provide a flange 48 running at right angles to the surface of the disk and parallel to the surface of the drum at the point at which the slot is tangent to the drum. Secured to the plate 13 adjacent the other edge of the slot 40, there is an angle member 49 to which, and to the flange 48, is welded at 50 a second angle member 51. The angle member 49 extends from the edge of one of the ribs 9 to the center of the next lower rib 9 (Fig. 1) and the angle member 51 extends between the adjacent edges of the two ribs 9 and acts as a closure member for the slot 39.

The slot 40 is formed in a manner similar to the slot 39 in that the portion of the segmental plate 13 is bent at 57 to form a flange 58 (Fig. 6) and an angle member 60 is welded to the edge of the slot 40 in the same manner as the angle member 49, but a removable closure member shown in detail in Fig. 8 and designated generally by the numeral 61 is provided in place of the angle member. This removable closure 61 comprises a channel shaped member 62 (Fig. 8), flanges 63 and 64 of which are adapted to engage the outer surfaces of the flange 58 and angle member 60, a nut and bolt assembly 65 mounted in a slot 66 in the flange 64 being provided for securing the closure 61 in place over the opening formed by the slot 40. The closure member 61 may be secured in place over the slot 40 by placing the closure over the slot and passing the head of the bolt 67 of the nut and bolt assembly through an enlarged portion 68 (Fig. 9) of a slot 66 formed in the angle member 60 and thereafter sliding the nut and bolt assembly to the left (Fig. 9) and tightening the nut in place.

After the heads and drum of the reel as described hereinbefore have been assembled and material placed on the reel, it may be desirable to enclose the material so wound on the reel with a protecting cover. The preferred form of enclosing lags is metallic sheets 70 corrugated in the direction of their length and curvature, the corrugations being so formed that when the lags are secured on the heads by means of nut and bolt assemblies 71, the corrugated portion will be of less diameter than the reel heads so that the weight of the reel will rest on the heads rather than on the lags.

Another form of radially extending rib which may be substituted for the ribs 9 is shown in Fig. 10 and comprises a rectangular shaped member formed from sheet steel which is designated by the numeral 76 and may be welded to the segmental plates 13 as shown at 77. When ribs of this type are used the segmental plates 13 may be dispensed with and a simple spoked reel will be provided.

In the preferred form of the invention as described hereinbefore, the various parts of the heads are seam welded with the usual arc welding equipment but it will be apparent that spot welding or any other suitable well known type of welding might be used without departing from the scope of the invention which is to be limited only by the scope of the appended claims.

What is claimed is:

1. In a reel, a head comprising a tubular hub, annular disks secured thereto to form an outwardly extending annular channel, radially extending channel members secured in the annular channel, and a circular channel member secured to the outer ends of the radially extending channel members.

2. In a reel, a head comprising a tubular hub, annular disks secured thereto to form an outwardly extending annular channel, radially extending channel members having their inner ends tapered for connection to each other and to the inner surface of the annular channel, and a channel member secured to the outer ends of the radially extending channel members.

3. In a reel, a head comprising a tubular hub, annular disks secured thereto to form an outwardly extending annular channel, radially extending channel members having their inner ends tapered for connection to each other and to the inner surface of the annular channel, a circular channel secured to the outer ends of the radially extending channel members, and a disk comprising a plurality of segmental plates secured to the radially extending channel members and the circular channel member to form a smooth surface on one side of the head.

4. In a reel, a head comprising a tubular hub, annular disks secured thereto to form an outwardly extending annular channel, radially extending channel members having their inner ends tapered for connection to each other and to the inner surface of the annular channel, a circular channel member secured to the outer ends of the radially extending channel members, a disk comprising a plurality of segmental plates secured to the radially extending channel members and to the circular channel member, said radially extending channel members being cut away and said segmental plates being offset adjacent their outer ends to present a smooth surface on one side of the head.

5. A reel comprising a pair of heads, a drum, each of said heads comprising a hub, radially extending channel members secured to the hub, a circular member fixed to the outer ends of the radially extending members, and a disk comprising a plurality of segmental plates secured to the radially extending channel members, one of said plates being slotted to provide a passageway through the head.

6. A reel comprising a pair of heads, a drum, each of said heads comprising a hub, radially extending channel members secured to the hub, a circular shaped member fixed to the outer ends of the radially extending members, a disk comprising a plurality of segmental plates secured to the radially extending channel members, one of said plates being slotted to provide a passageway through the head, and means for closing said passageway.

7. A reel comprising a pair of heads, a drum, each of said heads comprising a hub, radially extending channel members secured to the hub, a circular member fixed to the outer ends of the radially extending members, a disk comprising a plurality of segmental plates secured to the radially extending channel members, one of said segmental plates having an angular passageway formed therein tangentially to the drum, and closure members for said passageway.

8. A reel comprising a pair of heads, a drum, each of said heads comprising a hub, radially extending channel members secured to the hub, a circular member fixed to the outer ends of the radially extending members, a disk comprising a plurality of segmental plates secured to the radially extending channel members, one of said segmental plates having an angular slot therein formed with its angles disposed tangentially to the drum and each angularly disposed portion of the slot extending between adjacent radially extending channel members, and closure members for said slot.

9. A reel comprising a pair of heads, a drum, each of said heads comprising a hub, radially extending channel members secured to the hub, a circular member fixed to the outer ends of the radially extending members, a circular plate comprising a plurality of segmental plates secured to the radially extending channel members, one of said segmental plates having an angular slot therein formed in two planes, each portion being disposed tangentially to the drum and each extending between adjacent radially extending channel members, and closure members for said slot, one of said closure members being fixed and the other being removable.

10. A reel comprising spaced heads and a drum, each of said heads including radially extending channel members, a circular shaped channel member secured to the outer ends of the channel members, and a plurality of segmental plates secured to the channel members and offset adjacent their outer edges to present a smooth surface on one side of the head.

11. A reel comprising a pair of heads, a drum, each of said heads comprising a hub, radially extending channel members secured to the hub, a circular member fixed to the outer ends of the radially extending members, a disk comprising a plurality of segmental plates secured to the radially extending channel members, one of said segmental plates having an angular passageway formed therein with the various angles of the passageway positioned tangentially with respect to the drum, and a plurality of closure members for said passageway.

12. A reel comprising a pair of heads, a drum, each of said heads comprising a hub, radially extending channel members secured to the hub, a circular member fixed to the outer ends of the radially extending members, a disk comprising a plurality of segmental plates secured to the radially extending members, one of said segmental plates having an angular passageway formed therein with the various angles of the passageway positioned tangentially with respect to the drum, and a closure member for each of said angularly disposed portions of the passageway.

13. In a reel, a head comprising a hub, a head plate surrounding the hub, and channel members extending radially from the hub and having the flanges engaging and secured to the head plate with the bases of the channel spaced from the head plate.

14. In a reel, a head comprising an inner annular channel member, radially extending members having the inner ends secured within said channel member, and a circular channel member secured to the outer ends of said radially extending members.

15. In a reel, a head comprising an inner annular member, radially extending members having their inner ends secured to said member, a circular channel member secured to the outer ends of said radially extending members, and a disk comprising a plurality of segmental plates secured to the radially extending members and the circular channel member to provide a smooth surface on one side of the head.

ARTHUR A. BUREAU.